(12) United States Patent
Cho et al.

(10) Patent No.: US 7,817,922 B2
(45) Date of Patent: Oct. 19, 2010

(54) APPARATUS AND METHOD TO GENERATE CARRIER SUPPRESSED-RETURN TO ZERO OPTICAL SIGNAL

(75) Inventors: Hyun Woo Cho, Daejeon (KR); Dong Soo Lee, Gwangjoo (KR); Je Soo Ko, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 979 days.

(21) Appl. No.: 11/501,932

(22) Filed: Aug. 10, 2006

(65) Prior Publication Data

US 2007/0086787 A1 Apr. 19, 2007

(30) Foreign Application Priority Data

Oct. 19, 2005 (KR) .................... 10-2005-0098692

(51) Int. Cl.
*H04B 10/04* (2006.01)
(52) U.S. Cl. .................. 398/183; 398/186; 398/188; 398/201; 398/182
(58) Field of Classification Search ............. 398/182, 398/183, 185–188, 201
See application file for complete search history.

(56) References Cited

U.S. PATENT DOCUMENTS

| | | | | |
|---|---|---|---|---|
| 4,918,707 A * | 4/1990 | Yoshihara | .................. | 375/149 |
| 5,974,209 A * | 10/1999 | Cho et al. | .................... | 385/28 |
| 6,809,849 B2 | 10/2004 | Akiyama et al. | | |
| 6,882,802 B2 * | 4/2005 | Ohhira | ........................ | 398/188 |
| 7,110,681 B1 * | 9/2006 | Mizuochi | ..................... | 398/183 |
| 2003/0053179 A1 * | 3/2003 | Hayee | ......................... | 359/181 |
| 2004/0151506 A1 * | 8/2004 | Shiramizu et al. | ........... | 398/140 |
| 2004/0184818 A1 * | 9/2004 | Lee et al. | ..................... | 398/183 |
| 2004/0190910 A1 * | 9/2004 | Akiyama et al. | ........... | 398/186 |
| 2006/0193228 A1 * | 8/2006 | Bai | ......................... | 369/59.23 |
| 2006/0193229 A1 * | 8/2006 | Bai | ......................... | 369/59.23 |
| 2006/0193230 A1 * | 8/2006 | Bai | ......................... | 369/59.23 |
| 2006/0210210 A1 * | 9/2006 | Webb et al. | .................... | 385/1 |

FOREIGN PATENT DOCUMENTS

| | | |
|---|---|---|
| KR | 2003-0086564 | 11/2003 |
| KR | 2005-0045701 | 5/2005 |

OTHER PUBLICATIONS

Wen et al: "RZ/CSRZ-DPSK and Chirped NRZ Signal Generation Using a Single-State Dual-Electrode Mach-Zehnder Modulator", IEEE Photonics Technology Letters, vol. 16, No. 11, Nov. 2004, pp. 2466-2468.*

* cited by examiner

*Primary Examiner*—Li Liu
(74) *Attorney, Agent, or Firm*—Ladas & Parry LLP

(57) ABSTRACT

Provided are an apparatus and a method for generating a CS-RZ optical signal. The apparatus includes: a classifier distributing an input signal into two NRZ (non-return-to-zero) signals with an identical transmission speed; a first signal transformer converting one of the two NRZ signals into a first RZ signal using a full-frequency clock; a second signal transformer converting the other one of the two NRZ input signals into a second RZ signal using a full-frequency clock; a phase adjuster adjusting the first and second RZ signals so that a delay time corresponding to half a period of the input signal exists between the first and second RZ signals; a bias unit adding different DC (direct current) bias voltages to the first and second RZ signals; and a dual electrode optical modulator transforming the two electrical RZ signals into an optical CS-RZ signal.

14 Claims, 16 Drawing Sheets

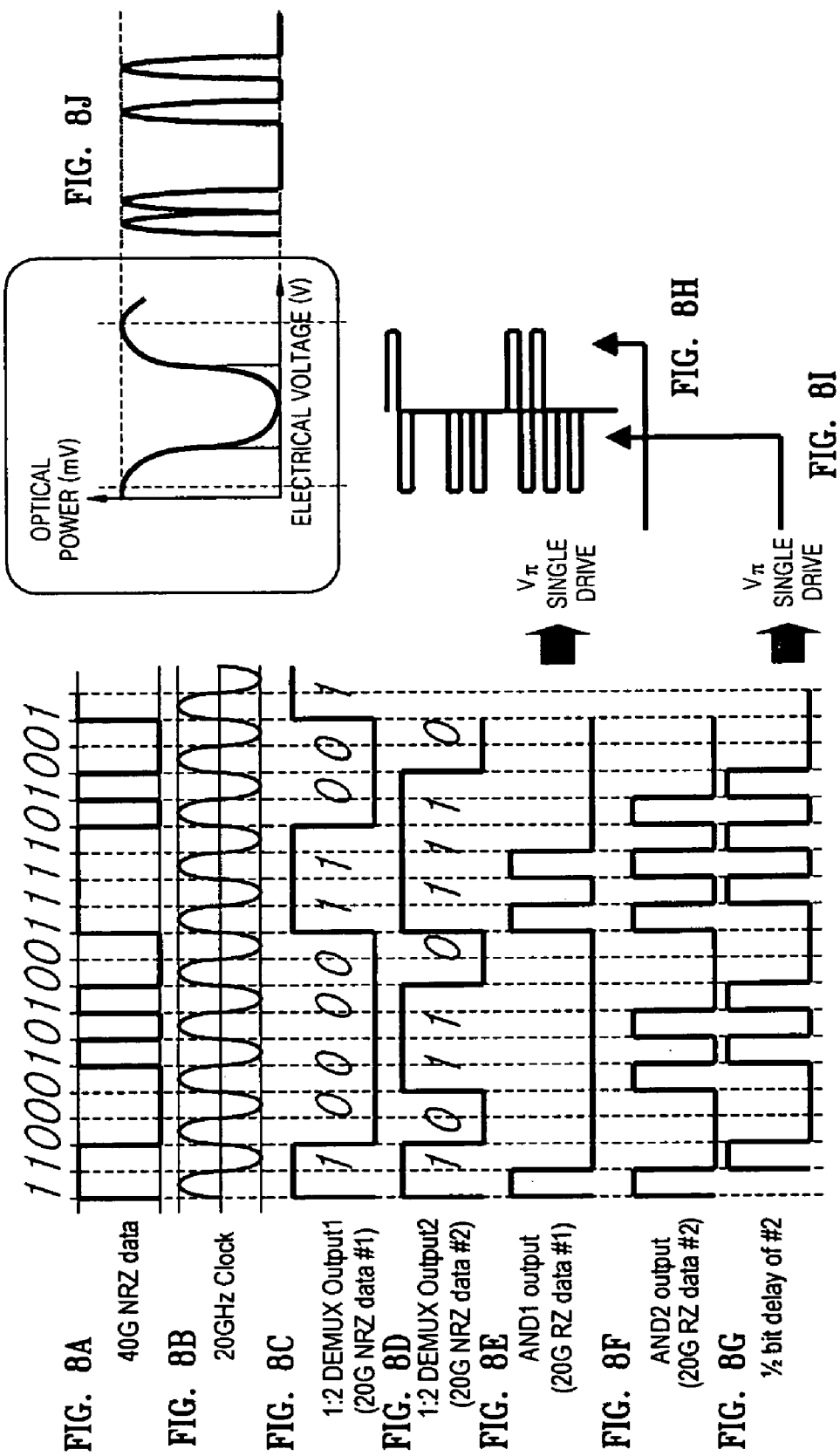

APPARATUS AND METHOD TO GENERATE CARRIER SUPPRESSED-RETURN TO ZERO OPTICAL SIGNAL

CROSS-REFERENCE TO RELATED PATENT APPLICATION

This application claims the benefit of Korean Patent Application No. 10-2005-0098692, filed on Oct. 19, 2005, in the Korean Intellectual Property Office, the disclosure of which is incorporated herein in its entirety by reference.

BACKGROUND OF THE INVENTION

1. Field of the Invention

The present invention relates to an apparatus for generating a carrier suppressed-return to zero (CS-RZ) optical signal.

2. Description of the Related Art

In optical communication systems, a non-return-to-zero (NRZ) format has been generally used because of its simple configuration and a low cost for implementing a transmitter and a receiver. However, as the bit-rate per each channel of a wavelength division multiplexing (WDM) systems is increased to expand the total capacity, such as 2.5 Gbps, 10 Gbps, and 40 Gbps, a return-to-zero (RZ) format has a great concern because of its larger tolerance against fiber non-linearity than the NRZ format.

In particular, studies on a carrier-suppressed return-to-zero (CS-RZ) format, which reduces an optical spectrum but maintains other advantages of the RZ format, have been reported recently. A conventional CS-RZ optical transmitter consists of either two-cascaded optical modulators or one electrical mixer and one optical modulator.

Thus, a conventional CS-RZ optical transmitter requires two-cascaded optical modulators, one for data encoding and the other for clock modulation. The modulator for clock modulation should be chirp-free or able to adjust a chirp parameter at least. It results in increasing a unit cost and complexity of the CS-RZ optical transmitter, and then the total price of the WDM system is increased as the wavelength is added for expanding capacity.

Also, a CS-RZ optical transmitter using one mixer and one optical modulator cannot be easily manufactured in terms of an ultrahigh speed signal. Thus, an eye diagram of an optical signal is distorted due to the serious limitation of bandwidth in the electrical mixer.

SUMMARY OF THE INVENTION

The present invention provides an apparatus and a method for generating a CS-RZ optical signal using an optical modulator in an ultrahigh speed optical communication network.

According to an aspect of the present invention, there is provided an apparatus for generating a CS-RZ (carrier suppressed-return to zero) optical signal, including: a classifier distributing an input signal into two NRZ (non-return-to-zero) signals with an identical transmission speed; a first signal transformer converting one of the two NRZ signals into a first RZ (return-to-zero) signal using a full-frequency clock; a second signal transformer converting the other of the two NRZ signals into a second RZ signal using a full-frequency clock; a phase adjuster tuning a delay time between the first and second RZ signals so that the second RZ signal is delayed against the first RZ signal by a half-period of the input signal; a bias unit applying different DC (direct current) bias voltages to the first and second RZ signals, respectively; and a dual electrode optical modulator transforming the two electrical RZ signals into an optical CS-RZ signal.

According to another aspect of the present invention, there is provided a method of generating a CS-RZ optical signal, including: distributing an input signal into two NRZ signals with an identical transmission speed; converting the two NRZ signals into first and second RZ signals using the full frequency clock; adjusting a phase difference between the first and second RZ signals so that there is a time delay corresponding to a half-period of the input signal between the two RZ signals; applying different DC bias voltages to the first and second RZ signals, respectively; and transforming the first and second electrical RZ signals to an optical CS-RZ signal.

BRIEF DESCRIPTION OF THE DRAWINGS

The above and other features and advantages of the present invention will become more apparent by describing in detail exemplary embodiments thereof with reference to the attached drawings in which:

FIGS. 8A through 8G are timing diagrams of the NRZ signals shown described with reference to FIGS. 6 and 7 according to a preferred embodiment of the present invention;

FIGS. 8H and 8I show amplified versions of the signals shown in FIGS. 8E and 8G.

FIG. 8J shows the optical CS-RZ signal obtained by converting the two RZ signals shown in FIGS. 8H and 8I.

DETAILED DESCRIPTION OF THE INVENTION

Figure 1A:
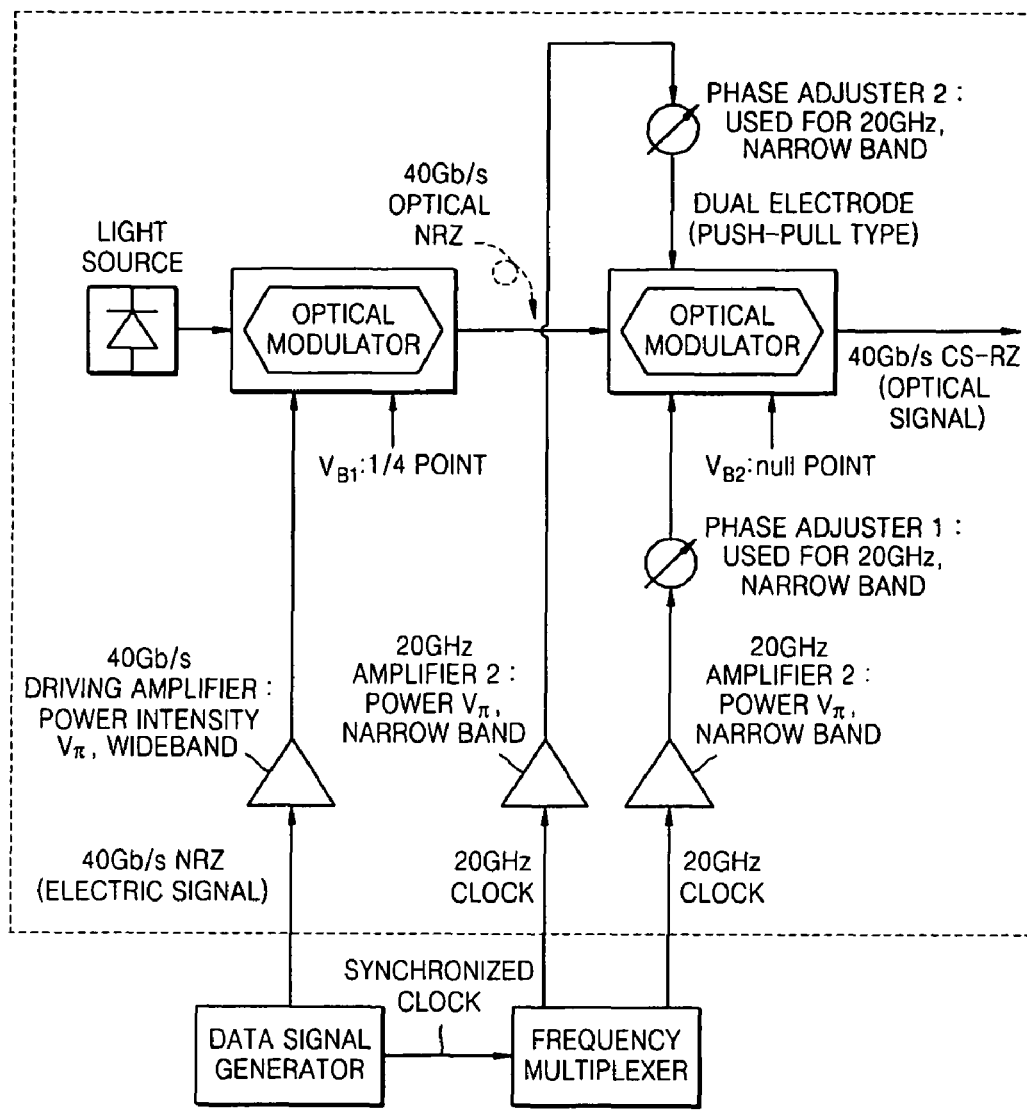
FIGS. 1A and 1B are block diagrams of a CS-RZ optical transmitter using two-cascaded optical modulators.

An RZ format has higher receiver sensitivity and larger tolerance against fiber non-linearity in optical link than an NRZ format, and a synchronization clock for recovering data in the receiver can easily be extracted. However, a bandwidth of an optical spectrum is wider than that of the NRZ format, so the RZ signal is weak to chromatic dispersion. As a result, a CS-RZ format to reduce an optical spectrum but also to maintain advantages of the conventional RZ format has been reported recently.

According to the reports, the CS-RZ signal is robust against fiber non-linearity like the RZ signal and thus can be transmitted to a long distance compared to an NRZ signal in high optical power. Also, a bandwidth of an optical spectrum of the CS-RZ signal is narrower than the conventional RZ signal and thus less affected by dispersion. In a case where the CS-RZ signal is applied to wavelength division multiplexing (WDM) systems, a greater number of channels than the NRZ signal can be added and then transmitted.

Accordingly, an optical signal generating apparatus for generating a CS-RZ signal according to a preferred embodiment will be described with reference to the attached drawings.

In the following description, same drawing reference numerals are used for the same elements even in different drawings. Also, well-known functions or constructions are not described in detail since they would obscure the invention in unnecessary detail.

Figure 1B:
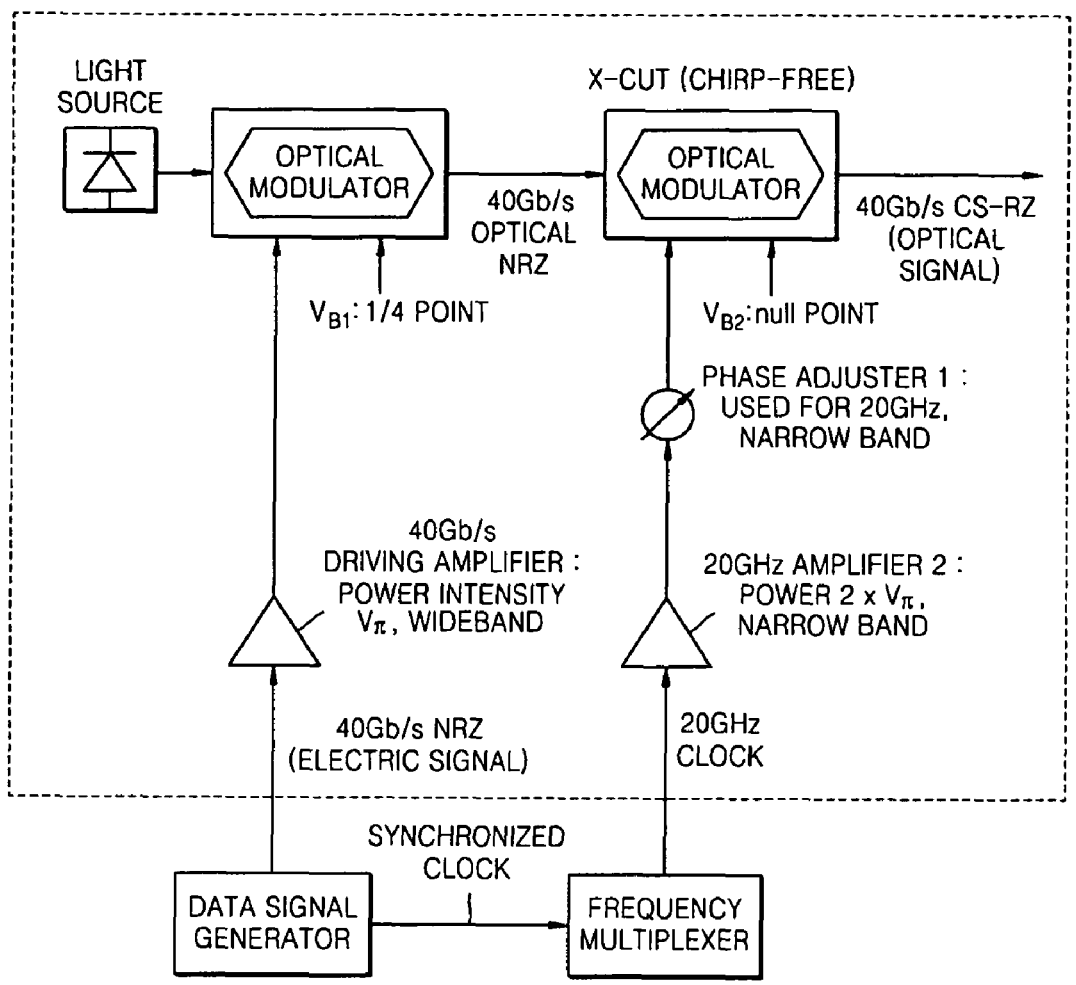

FIGS. 1A and 1B are block diagrams of a CS-RZ optical transmitter using two-cascaded optical modulators.

The output signals from two-cascaded optical modulators shown in FIG. 1A or FIG. 1B have the characteristics that the phases of their every adjacent bit are always opposite to each other.

In detail, one of the two optical modulators operates as a conventional NRZ optical modulator, and the other one alternately reverses a phase of a clock signal with a half-frequency so as to generate an RZ signal featuring adjacent bits with opposite phases.

The second optical modulator for modulating clock signals must be a chirp-free type or a push-pull dual electrode type. The push-pull dual electrode type optical modulator is capable of changing a chirp-parameter so that the chirp value reaches "zero" by using the characteristics of push-pull modulation. The chirp-free type optical modulator, for example, may be an x-cut $LiNbO_3$ modulator or another materialized optical modulator.

In other words, for the dual-electrode modulators, differential clock signals are applied to the dual-electrode optical modulator as shown in FIG. 1A or for the single-electrode modulators, single-ended clock signals are applied to chirp-free single-electrode optical modulators as shown in FIG. 1B.

Thus, the first one of the two-cascaded optical modulators shown in FIG. 1A or 1B converts an NRZ electrical signal into an optical signal, and the second one allows phases of adjacent bits to be opposite to each other.

The amplitude of the half-frequency clock signal, which is a single-ended amplitude for the single-electrode modulator but is a differential amplitude for the dual-electrode modulator, must be amplified so as to be two times a driving voltage required to swing from a maximum peak to a minimum peak in a transfer function of the optical modulators. A bias point of a direct current (DC) voltage must be positioned at a null point of the transfer function. Details on phase shifts between adjacent bits as the half-frequency clock in the second optical modulator will be described with reference to FIG. 2.

Figure 2:
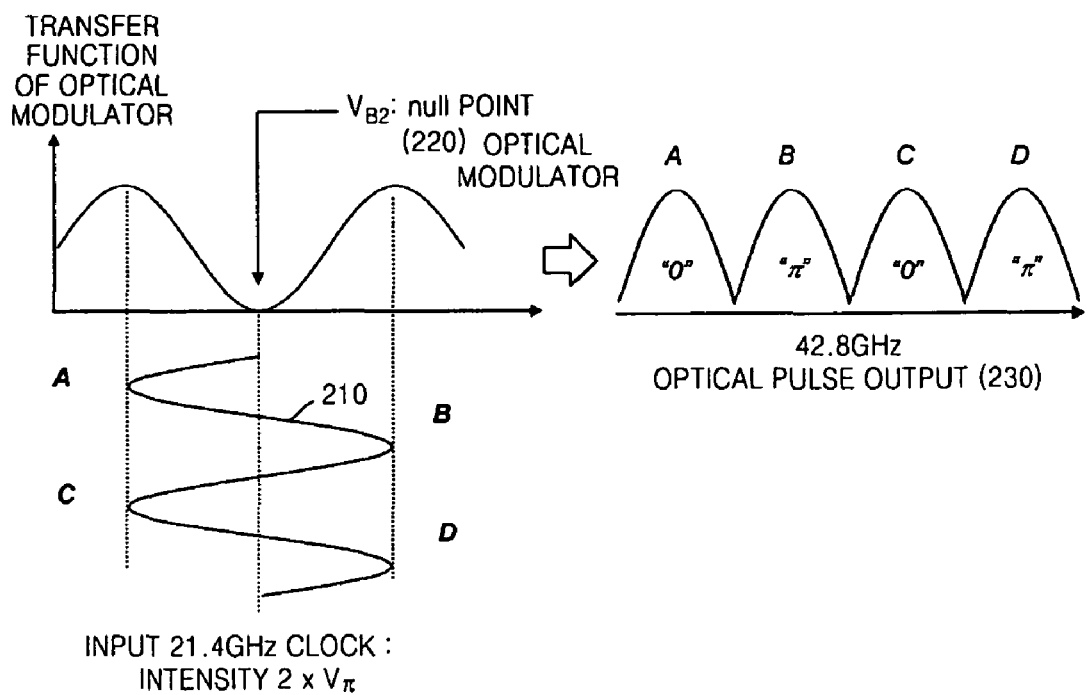
FIG. 2 shows an example on the transfer curve of a 42.8 Gb/s CS-RZ optical transmitter to explain a phase inversion of every adjacent bit as a half-frequency (21.4 GHz) clock is modulated with biasing adequately in a second optical modulator shown in FIGS. 1A and 1B.

FIG. 2 is an example on the transfer curve of a 42.8 Gb/s CS-RZ optical transmitter to explain a phase inversion between every adjacent bits as a half-frequency (21.4 GHz) clock is modulated with biasing adequately in the optical modulator shown in FIG. 1A or 1B.

In the 42.8 Gb/s CS-RZ optical transmitter, the frequency of a clock signal 210, i.e., 21.4 GHz, which corresponds to a half-frequency of a data transmission speed of 42.8 Gb/s, and the amplitude of the clock signal 210 should be two times a driving voltage. Then the 21.4 GHz clock signal 210 is applied to an input electrode of the optical modulator with a DC voltage adjusted to a null point 220 at which a magnitude of a transfer function is minimum.

As a result, an optical pulse stream of 42.8 GHz-frequency that corresponds to two times of the 21.4 GHz clock signal 210 is generated. Since "A", "C", and the next odd pulses in FIG. 2 are converted through a falling curve of the transfer function but "B", "D" and the next even pulses in FIG. 2 are converted through a rising curve of the transfer function, the adjacent bits of output pulse stream are the same amplitude but are 180° ($\pi$ radian) out of phase with each other as shown with reference numeral 230.

Figure 3A:
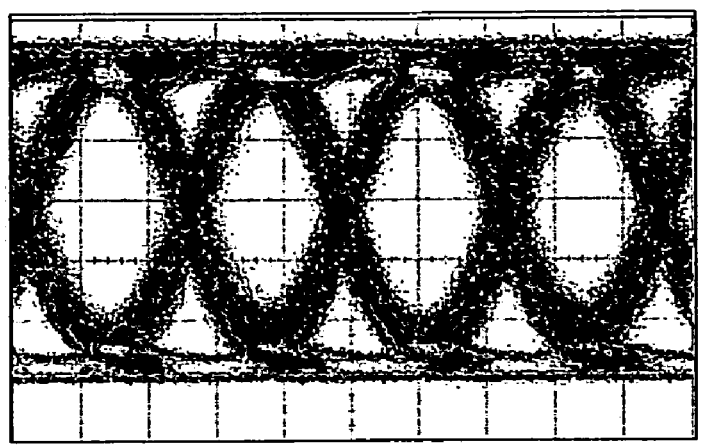
FIGS. 3A and 3B are experimental results measured by a sampling oscilloscope, which are expressed by means of eye-diagrams at the first and second modulator of the CS-RZ optical transmitter shown in FIG. 1B.
Figure 3B:
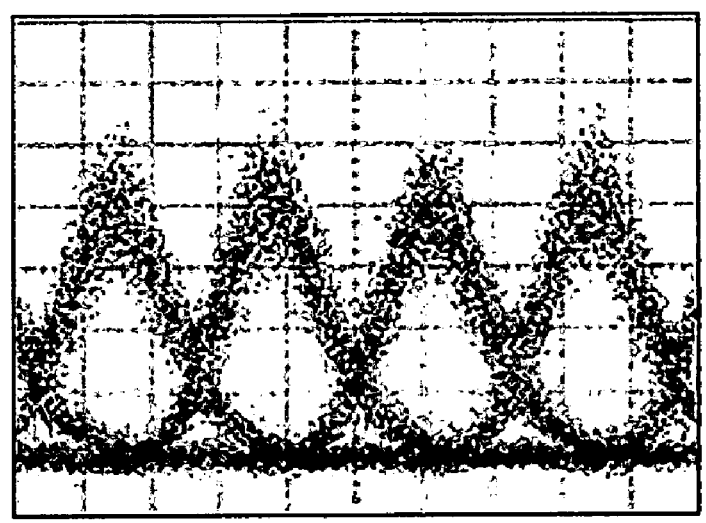

FIGS. 3A and 3B are experimental results measured by a sampling oscilloscope, which expressed by means of eye-diagrams at the first and second modulator of the CS-RZ optical transmitter shown in FIG. 1B.

FIG. 3A is an eye diagram of an output of the first optical modulator shown in FIG. 1B, i.e., an NRZ optical signal of 42.8 Gb/s. The NRZ optical signal is provided as a light source of the second optical modulator shown in FIG. 1B. FIG. 3B is an eye diagram of a CS-RZ optical signal of 42.8 Gb/s output from the second optical modulator shown in FIG. 1B.

As described above, phases of adjacent bits are opposite to each other due to the clock modulation in the second optical modulator shown in FIG. 1B. As a result, the carrier power in optical spectrum is suppressed.

Figure 4:
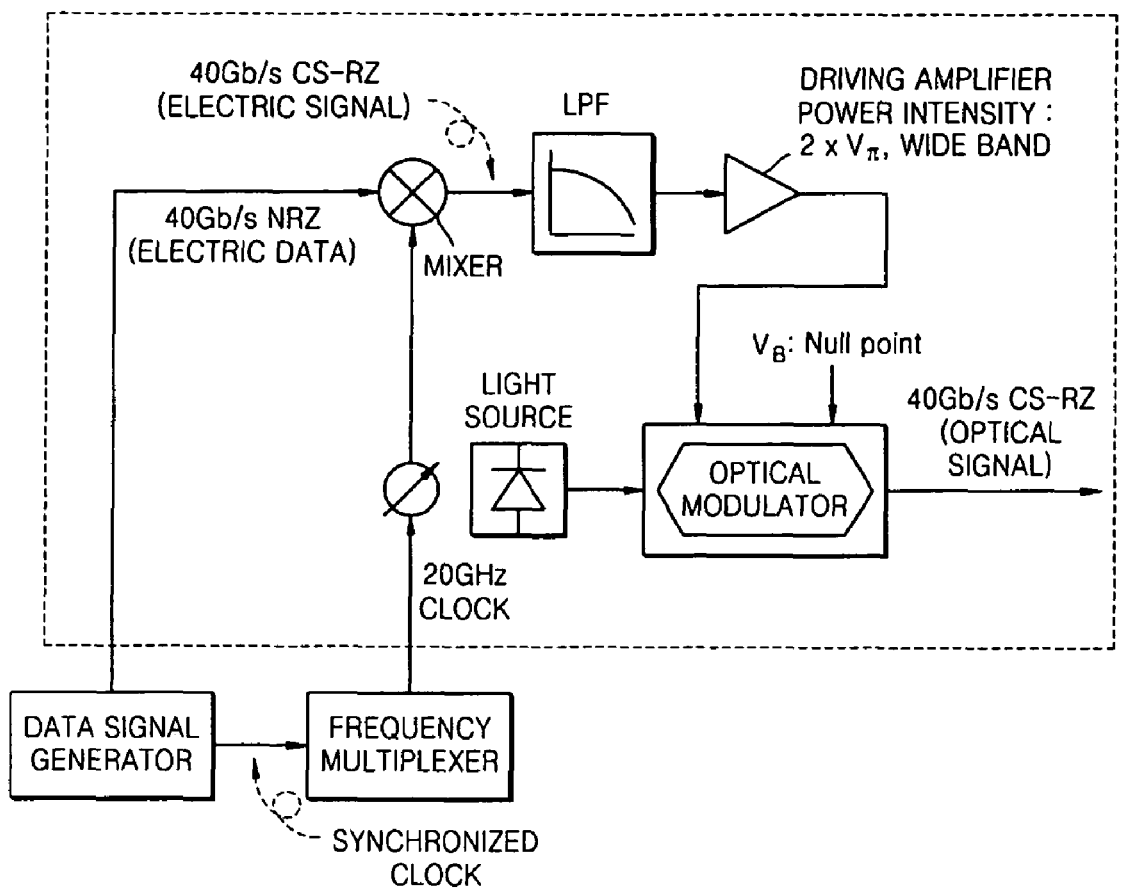
FIG. 4 is a block diagram of a CS-RZ optical transmitter using an electrical mixer and an optical modulator.

FIG. 4 is a block diagram of a CS-RZ optical transmitter using a mixer and an optical modulator.

The CS-RZ optical transmitter shown in FIG. 4 electrically mixes a data signal with a half-frequency clock signal to generate a 3-level electrical signal, limits a bandwidth of the 3-level signal using a low pass filter (LPF), and applies the 3-level signal to the optical modulator to generate a CS-RZ optical signal.

Figure 5A:
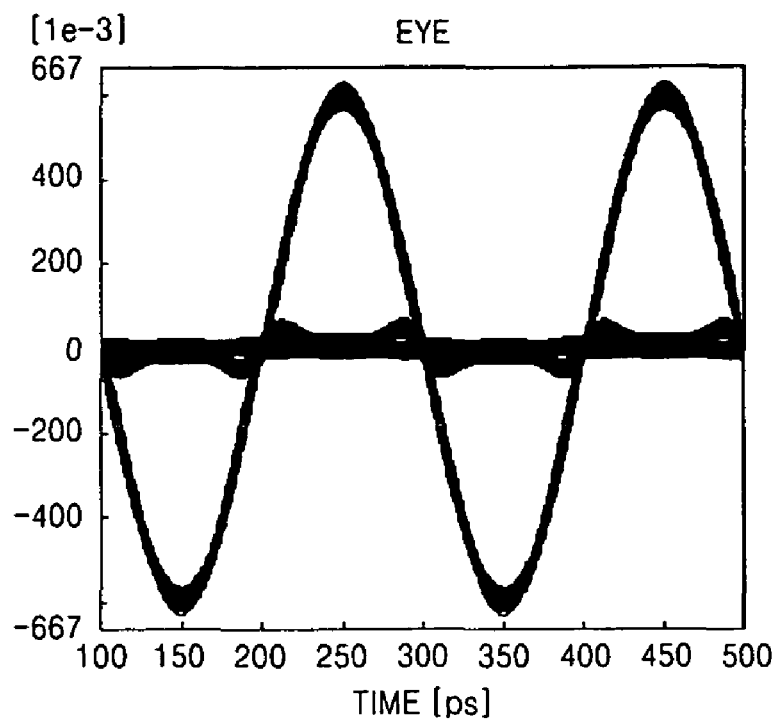
FIGS. 5A and 5B show simulation results expressed by means of eye diagrams at the mixer and modulator of the CS-RZ optical transmitter shown in FIG. 4.
Figure 5B:
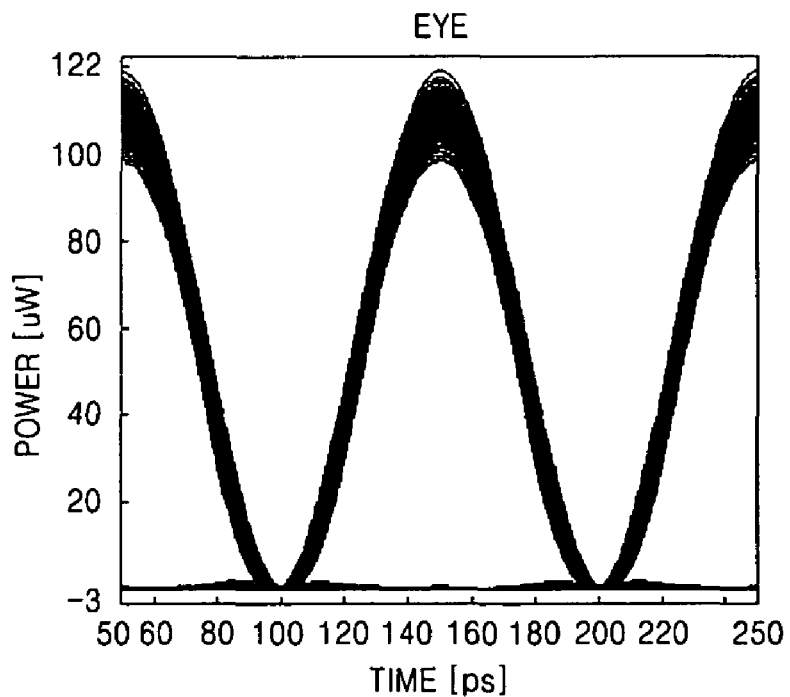

FIGS. 5A and 5B are simulation results expressed by means of eye diagrams at the mixer and the optical modulator of the CS-RZ optical transmitter shown in FIG. 4.

It is assumed that the mixer has an ideal characteristic. In other words, it is supposed that an input and output bandwidth of the mixer is infinite.

FIG. 5A is a simulation result of an electrical signal generated from the mixer and the LPF. As shown in the eye diagram of FIG. 5A, a 3-level signal has periodically opposite signs but the same amplitude. In other words, the 3-level signal has the characteristic of a CS-RZ signal featuring adjacent bits with the same magnitude and opposite phases.

Then, the 3-level signal is amplified to two times of the driving voltage as described with reference to FIG. 2 and add a DC bias adjusted to a minimum point of a transfer function of the optical modulator. As a result, a CS-RZ optical signal can be generated as shown in FIG. 5B.

Figure 6:
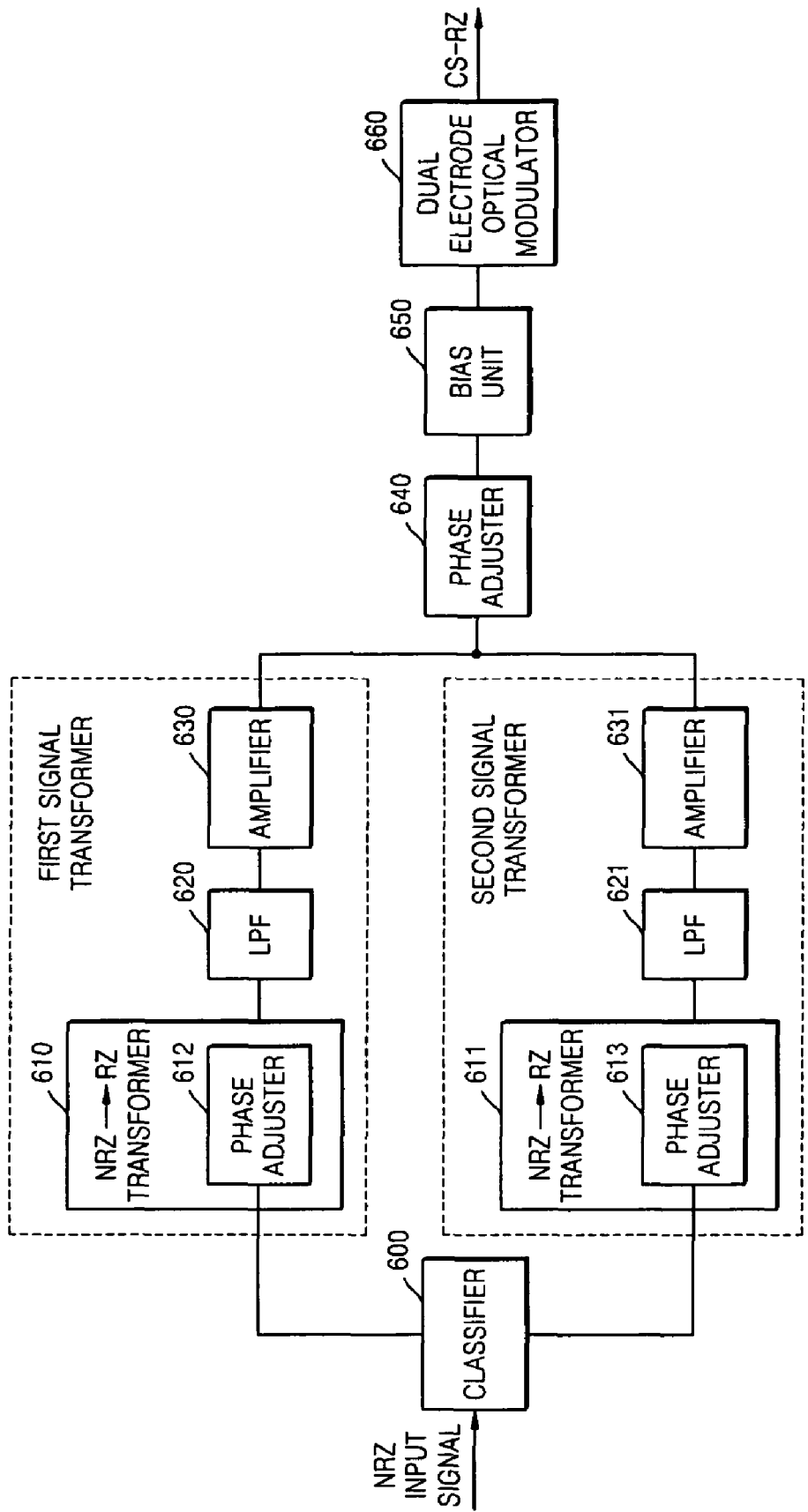
FIG. 6 is a block diagram of an apparatus for generating a CS-RZ optical signal according to a preferred embodiment of the present invention.

FIG. 6 is a block diagram of a CS-RZ optical signal generating apparatus according to a preferred embodiment of the present invention. Referring to FIG. 6, the CS-RZ optical signal generating apparatus includes a classifier 600, two transformers 610 and 611, two LPFs 620 and 621, two electrical amplifiers 630 and 631, a phase adjuster 640, a bias unit 650, and a dual electrode optical modulator 660.

If the transmission speed of an electrical data signal is B (b/s; bit per second), the classifier 600 distributes the electric data signal into two NRZ input signals having bit rates of B/2 (b/s) which corresponds to a half of the original transmission speed of the input signal.

The two distributed NRZ signals are used as data input to digital logic circuits into the transformers 610 and 611. As described above, the classification of the input signal can result in mitigating the bandwidth-limitation of electrical devices from B (b/s) to B/2 (b/s). This leads to a reduction of a unit cost.

The transformers 610 and 611 perform AND operations on the distributed NRZ electric signal of B/2 (b/s) and a clock of B/2 (Hz) so as to transform the NRZ signal into an RZ signal.

The clock and data must be in-phase each other. Thus, the transformers 610 and 611 further include phase adjusters 612 and 613 allowing the phases of the clock and the data signal to coincide with each other.

The LPFs 620 and 621 inhibit high frequency portion of the electrical signals via the transformers 610 and 611. In other words, the LPFs 620 and 621 pass only a certain-ranged low frequency band so as to reduce an overall spectrum, thus resulting in an increase of wavelength efficiency.

The amplifiers 630 and 631 respectively amplify the input signal to a voltage amplitude required for driving each port into the dual electrode optical modulator 660.

The phase adjuster 640 is disposed in the next stage of the amplifiers 630 and 631 so that one of the two amplified RZ signals is delayed by a half period of that RZ signal.

In other words, according to Equation 1 in which a period is inversely proportional to a transmission speed, a period of the amplified signal with the bit-rate B/2 (b/s) is 2/B (s).

$$\text{Period }(s) = 1/\text{Transmission Speed }(b/s) \quad (1)$$

Thus, the phase adjuster 640 tunes a phase difference between the two RZ signals so that the delay time becomes the half-period, that is, 1/B (s).

The RZ signal always returns to zero whatever the information of bit is zero or not, which origins the name, RZ. If the RZ signal with the duty of 50% or less is assumed, the 50% or more region of every single bit, that is "returned zero" region, don't include any information. Thus, as the region including information of one of two RZ signals overlaps over "returned zero" region of the other one of the two RZ signals, the resulting signal become the RZ signal of the bit-rate B (b/s) including both information of two input signals.

In other words, the phase adjuster 640 adjusts the phase difference between the two RZ signals so that a time delay between the two RZ signals becomes a ½ period, precisely. This will be described in more detail with reference to FIG. 8G.

The bias unit 650 applies a predetermined DC bias voltage that corresponds to the quadrate point of the transfer curve in the optical modulator. Generally, as the interferometer-type modulator has the transfer curve like a sine wave curve, the quadrate point is the middle point between maximum peak and minimum peak. Thus, the DC bias voltages are predetermined at the voltage corresponding to the quadrate point of rising side and falling side in the transfer function. The bias unit 650 adds DC biases to the RZ signals at the quadrate points of the transfer function in the optical modulator. Points to which DC biases are applied will be described in more detail with reference to FIG. 12.

The dual electrode modulator 660 converts the electrical RZ signals to which the DC bias voltages are added into the optical CS-RZ signal.

Figure 7:
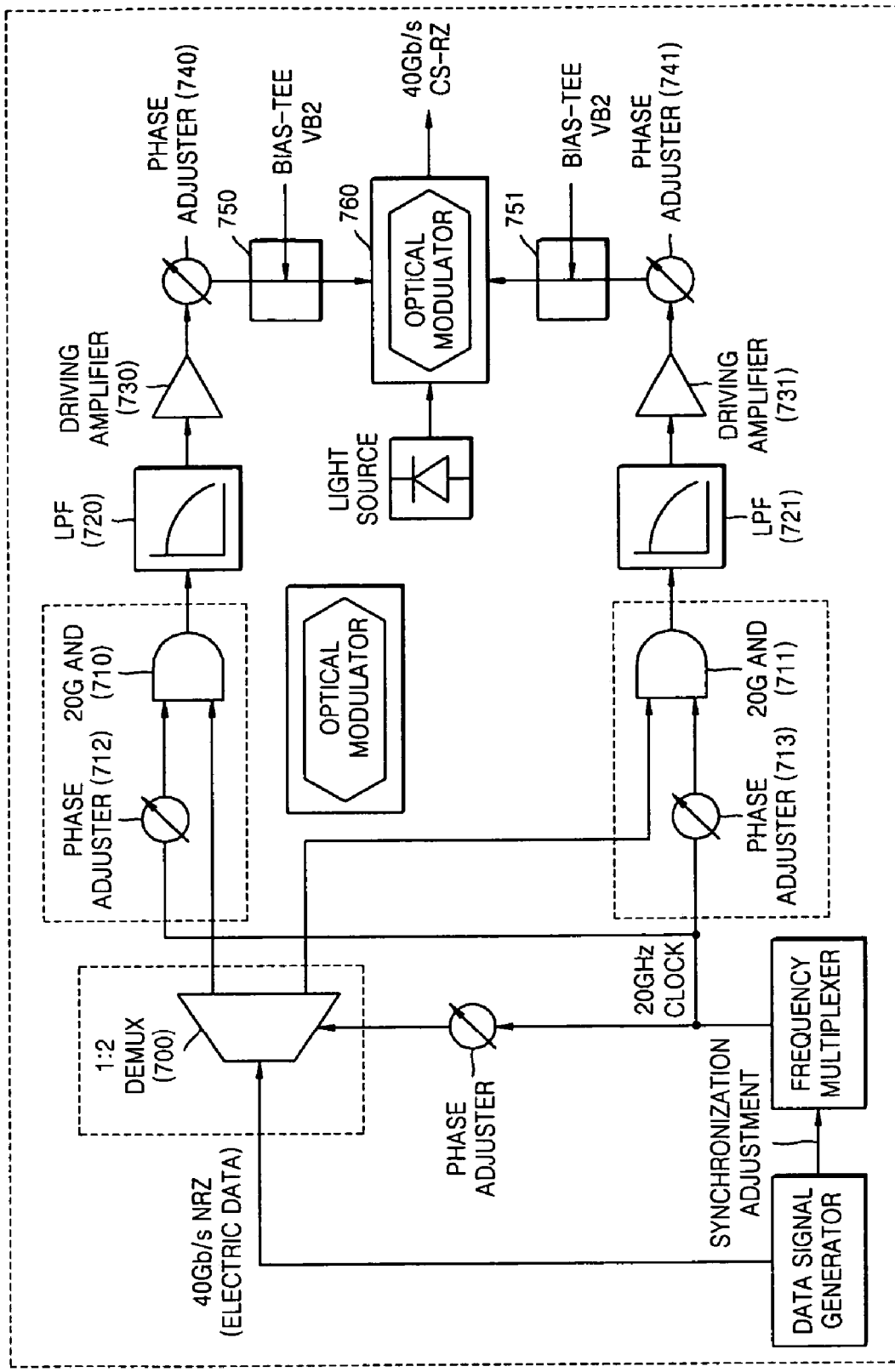
FIG. 7 is a detailed block diagram of an apparatus for generating a CS-RZ optical signal according to a preferred embodiment of the present invention.

According to a preferred embodiment of the present invention, a CS-RZ optical generating apparatus uses only one optical modulator so as to reduce total unit cost, compared to the conventional optical transmitter shown in FIG. 1 FIG. 7 is a detailed block diagram of a CS-RZ optical signal generating apparatus according to a preferred embodiment of the present invention.

As shown in FIG. 7, the input data may be a high-speed, broad-band signal having, for example, a bit-rate of 40 Gb/s. However, the CS-RZ optical signal generating apparatus can operate regardless of the transmission speed B.

If an electrical data signal is a 40 Gb/s NRZ signal, a 1:2 demultiplexer 700 operating as the classifier 600 shown in FIG. 6 demultiplexes the electrical data signal into two 20 Gb/s signals by using time-division demultiplexing. The two 20 Gb/s signals are respectively used as data input to two-parallel digital logics of AND circuits 710 and 711.

The AND circuit operates as the electrical "NRZ-to-RZ transformer" using the 20 Gb/s NRZ signals and a 20 GHz clock, i.e., a half-frequency (B/2) clock of the original signal. The RZ signals limit their bandwidths by LPFs 720 and 721.

Phase adjusters 712 and 713 allow phases of a clock signal input and the electrical NRZ data signal to coincide with each other.

Driver amplifiers 730 and 731 amplify the 20 Gb/s RZ signals to the voltage amplitude ($V_\pi$) required for swinging between the maximum and the minimum peak of a dual electrode optical modulator The 20 Gb/s RZ signals are adjusted by phase adjusters 740 and 741 to be delayed by a half-period of the amplified RZ signals from each other. Bias −Ts 750 and 751 add DC biases to the RZ signals at the quadrate points of a transfer function in the dual electrode optical modulator 760, and the dual electrode optical modulators 760 converts the electrical RZ signals biasing the DC voltage into an optical CS-RZ signal.

FIGS. 8A through 8G are timing diagrams of the NRZ signals shown described with reference to FIGS. 6 and 7 according to a preferred embodiment of the present invention.

To explain the mechanism of generating the optical CS-RZ signal using the preferred embodiment of the present invention, an arbitrary bit-stream of "1100010100111101001" having a transmission speed B of 40 Gb/s is illustrated in FIG. 8A. FIG. 8B shows a half-frequency clock, i.e., a 20 GHz clock, that corresponds to half a bit-rate of input data.

The 40 Gb/s signal shown in FIG. 8A and the 20 GHz clock signal shown in FIG. 8B are input to a ½ demultiplexer as an example of a classifier so as to de-multiplex the 40 Gb/s signal into two 20 Gb/s signals. Next, when the de-multiplexed 20 Gb/s signals and the 20 GHz clock signal are input to an AND logic device, the two-parallel RZ signals are output as shown in FIGS. 8E and 8F.

A signal shown in FIG. 8G is obtained by delaying the RZ signal of FIG. 8E by half a period. The signal shown in FIG. 8G is amplified up to a driving voltage ($V_\pi$) of a dual electrode optical modulator and then inverted as shown in FIG. 8H.

A DC bias is added to the inverted RZ signal shown in FIG. 8H at a quadrate point on a falling curve of a transfer function in the dual electrode optical modulator. The other RZ signal shown in FIG. 8I is added to another quadrate bias voltage, for example, on the rising curve of the transfer function. Because the delay between the two signals is precisely half a period of these signals, the optical modulator characterized by the transfer function shown in FIG. 8 converts the two RZ signals into an optical CS-RZ signal.

Figure 9A:
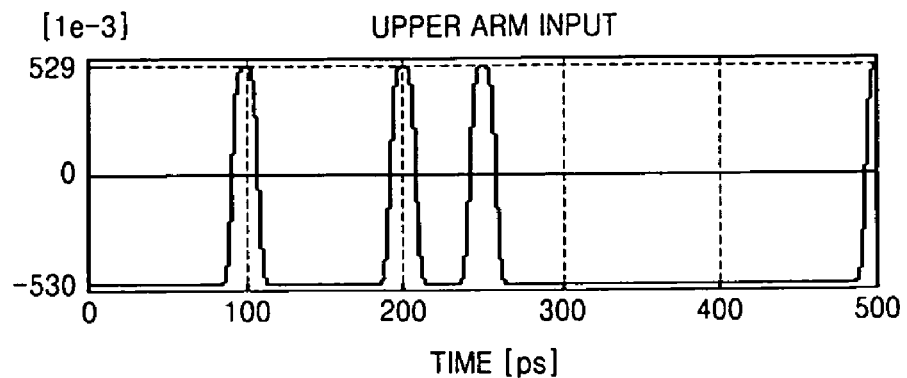
FIGS. 9A through 9C show simulation results, which are expressed by means of "0" and "1" pattern streams, performed with respect to the CS-RZ optical signal generating apparatus shown in FIGS. 6 and 7 according to a preferred embodiment of the present invention.
Figure 9B:
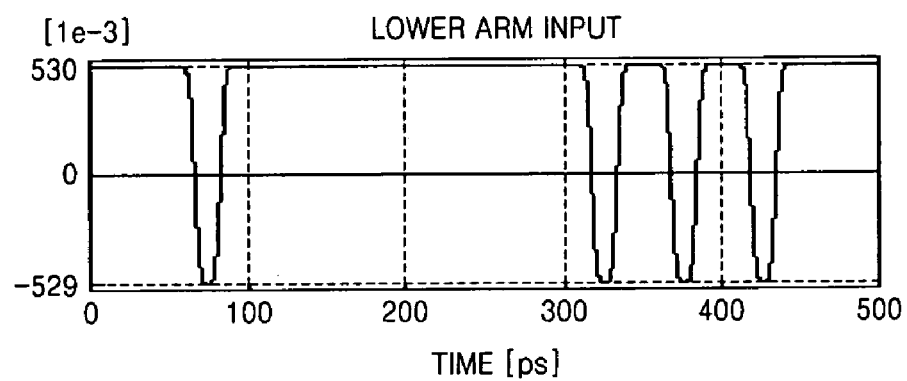
Figure 9C:
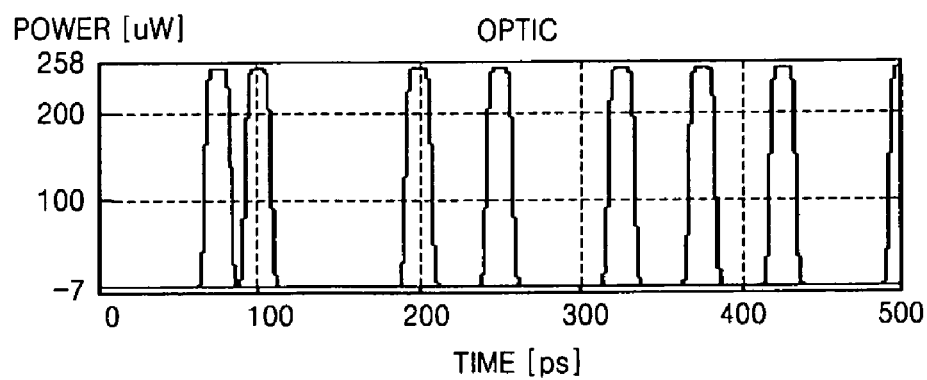

FIGS. 9A through 9C are simulation results, which are expressed by means of "0" and "1" pattern streams, performed with respect to the CS-RZ optical signal generating apparatus shown in FIGS. 6 and 7 according to a preferred embodiment of the present invention.

FIGS. 9A and 9B show 20 Gb/s RZ signals generated by 20 Gb/s pseudo-random bit sequence (PRBS) generator in the simulation tool. The RZ signal of FIG. 9B is inverted like FIG. 8H and delayed by a half of a period.

The RZ signals shown in FIGS. 9A and 9B are applied to a dual electrode optical modulator of a CS-RZ optical generating apparatus according to preferred embodiment of the present invention. Here, when DC voltages are biasing at the quadrate points, i.e., at a middle point of the rising and falling curve, a 40 Gb/s CS-RZ signal as shown in FIG. 9C can be generated under the simulation. Thus, it is confirmed on a preferred embodiment of the present invention by means of the simulation.

Figure 10A:
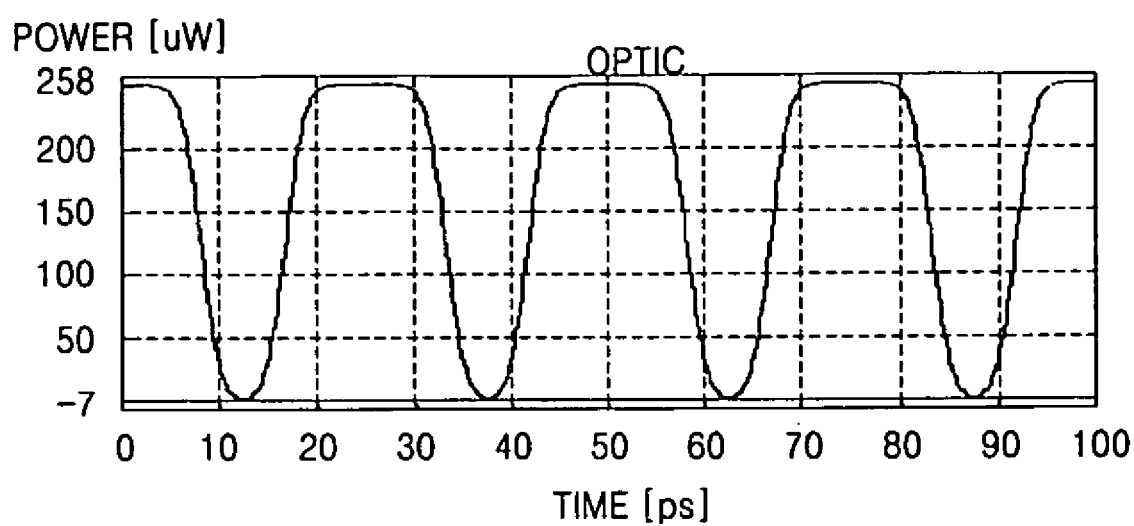
FIG. 10A is a simulation result, which is expressed by means of an eye diagram, performed with respect to the CS-RZ optical generating apparatuses shown in FIGS. 6 and 7 according to a preferred embodiment of the present invention.

FIG. 10A is a simulation result, which is expressed by means of an eye diagram, performed with respect to the CS-RZ optical generating apparatuses shown in FIGS. 6 and 7 according to a preferred embodiment of the present invention.

Figure 10B:
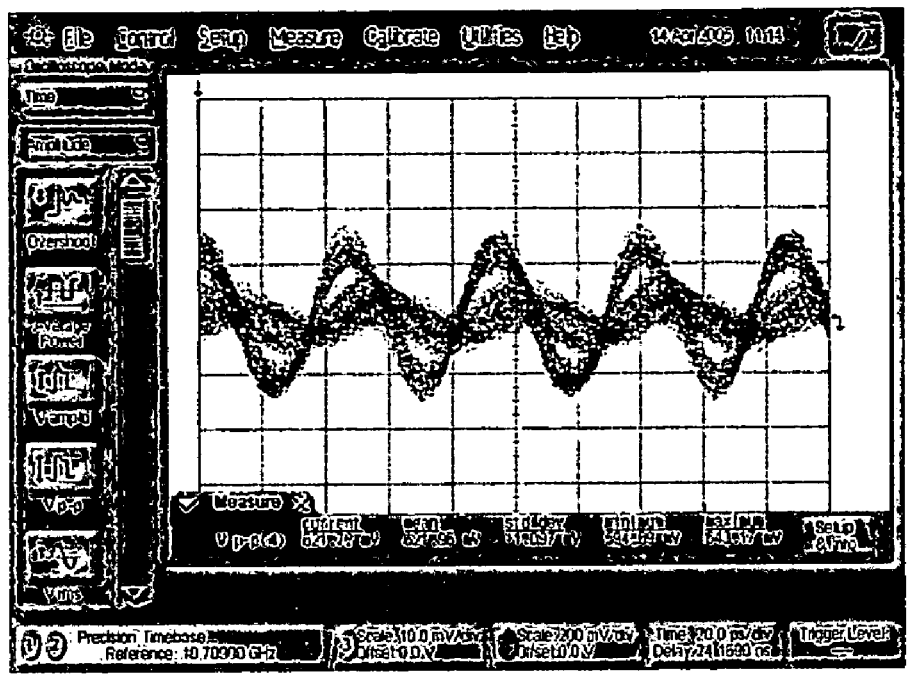
FIG. 10B is an experimental result measured by a sampling oscilloscope, which is expressed by means of an eye diagram, on the 40 Gb/s CS-RZ optical transmitter using the mixer and the optical modulator shown in FIG. 4.
Figure 10C:
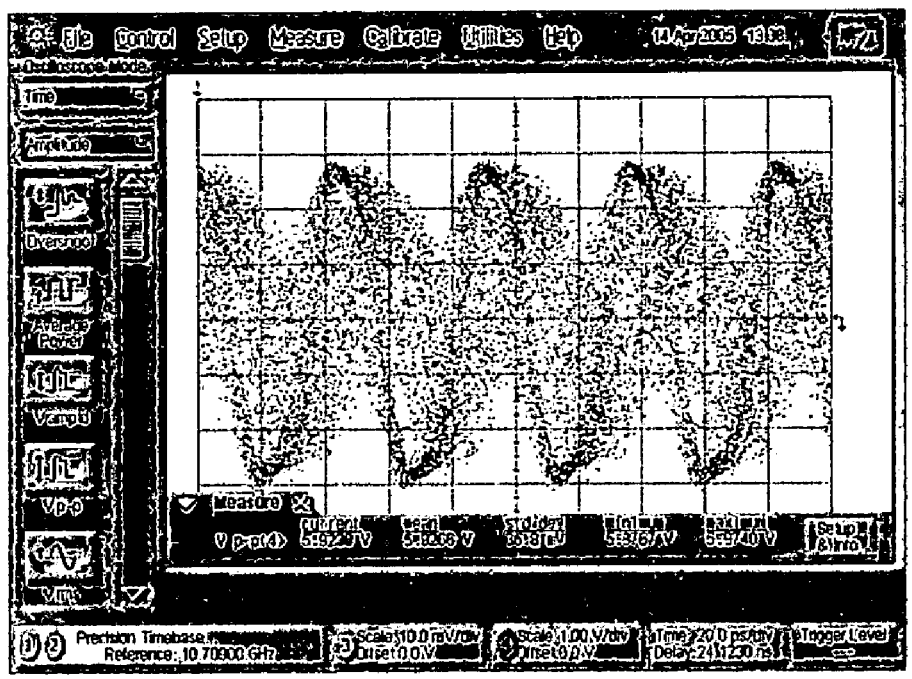
FIG. 10C is an eye diagram representing that the eye is almost closed because a driver amplifier operates in a saturation region.

FIG. 10B is an experimental result measured by a sampling oscilloscope, which is expressed by means of an eye diagram, on the 40 Gb/s CS-RZ optical transmitter using the mixer and the optical modulator shown in FIG. 4, and FIG. 10C is an eye diagram representing that the eye is almost closed because a driver amplifier operates in a saturation region.

Contrast with FIG. 10B, the CS-RZ optical generating apparatus of the present invention does not make ripples near the zero ("0") level as shown in FIG. 10A.

In other words, the electrical mixer shown in FIG. 4 logically performs an electrical multiplication on a data signal with the bit-rate of B (b/s) and a clock signal with the frequency of B/2 (Hz). For example, in a case of an ultrahigh speed signal of 40 Gb/s, the bandwidth of electrical devices requires DC to 32 GHz or more for propagating without missing the information.

However, although an available mixer is used for a high frequency, the mixer characterizes that a certain high, but narrow bandwidth signal (i.e., RF signal) down-converts to a certain low, but also narrow signal (i.e., LO signal) and vice versa. Thus, the mixer must come over a relatively high low-frequency cut-off for a wideband signal used in an optical communication system.

However, the CS-RZ optical generating apparatus of the present invention is almost not affected by such a low-frequency cut-off. Thus, ripples can be so small to be ignored as shown in FIG. 10A.

Also, in a case of a CS-RZ optical transmitter using a mixer, 40 Gb/s wideband data must be amplified to be two times a driving voltage ($2 \times V_\pi$). However, in the present invention, two 20 Gb/s data of relatively low bandwidth are amplified up to a driving voltage ($V_\pi$). Thus, a restriction on a driving amplifier can be mitigated. Due to these reasons, the CS-RZ optical transmitter of the present invention can have a lot of advantages for an ultra high speed optical communication system of more than 40 Gb/s.

In addition, the driver amplifier operates a gain-saturated region for high output amplitude, for example, in a conventional modulator case where $2 \times V_\pi$ is 10 Vp-p or more. In that case, because the amplifier does not amplify linearly according to an input amplitude, the driver amplifier amplifies small ripples by a relatively high gain but amplifies "1" and "−1" signals generated by the mixer by a relatively low gain. Thus, an eye diagram of an optical signal may be almost closed because of large amplified ripple signals as shown in FIG. 10C.

The CS-RZ optical generating apparatus of the present invention amplifies the signals up to a driving voltage ($V_\pi$) of each electrode of a dual electrode optical modulator. Thus, the driver amplifier can sufficiently operate in a linear region. Thus, the above problem can be solved.

Figure 11A:
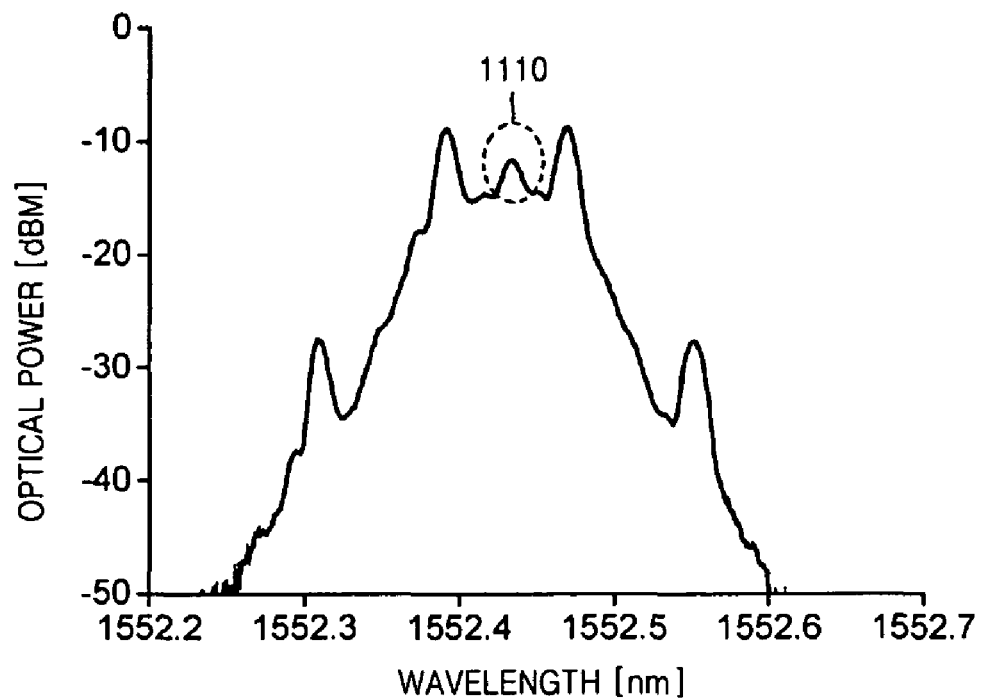
FIG. 11A is an optical spectrum when a gain of the driver amplifier of the CS-RZ optical transmitter using the mixer and the optical modulator shown in FIG. 4 is not sufficient.

FIG. 11A is an optical spectrum when an amplification gain of the driver amplifier of the CS-RZ optical transmitter using the mixer and the optical modulator shown in FIG. 4 is not sufficient.

Figure 11B:
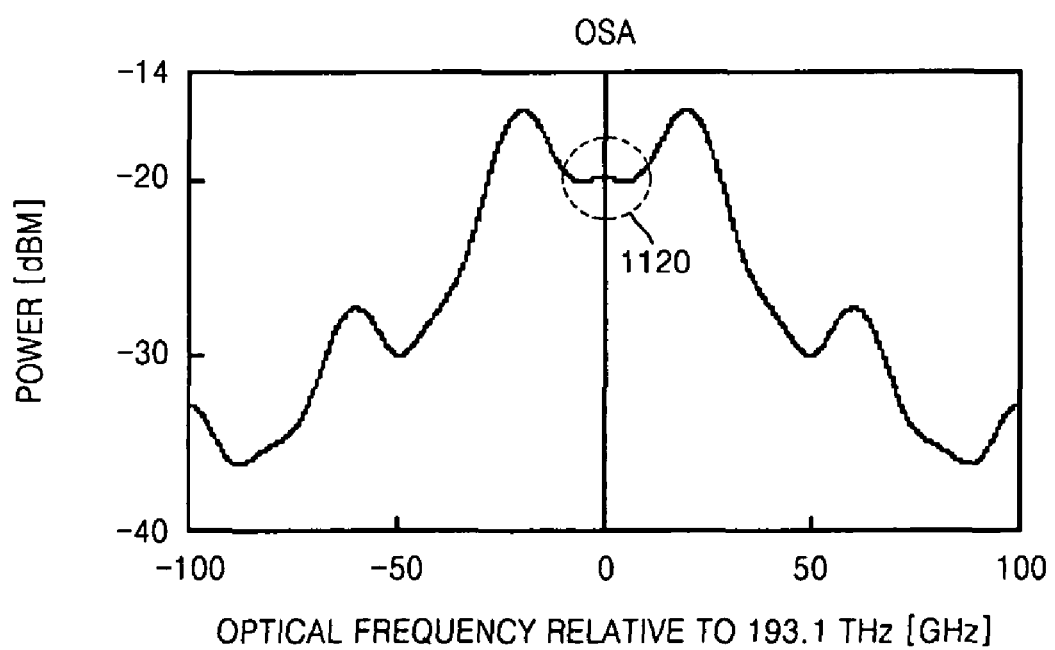
FIG. 11B shows the optical spectrum of FIG. 9C and FIG. 10A according to a preferred embodiment of the present invention.

In a case where the amplification gain of the driving amplifier is not sufficient, a power of carrier as shown at portion 1110 is not suppressed well, and a peak remains. It is a critical defect not to suppress the carrier power because it violates a fundamental characteristic of the Carrier-Suppressed RZ (CS-RZ) signals. FIG. 11B is the optical spectrum of FIGS. 9C and 10A according to a preferred embodiment of the present invention.

As the restriction on the driver amplifier is removed, a carrier power can be suppressed well at portion 1120 as shown in FIG. 11B.

Figure 12A:
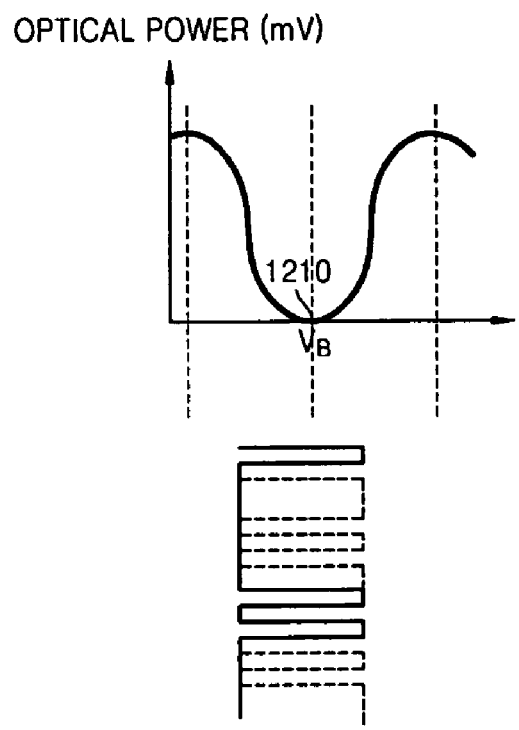
FIGS. 12A and 12B are graphs illustrating an adequate point to which a DC bias is applied in the CS-RZ optical generating apparatus according to a preferred embodiment of the present invention.
Figure 12B:
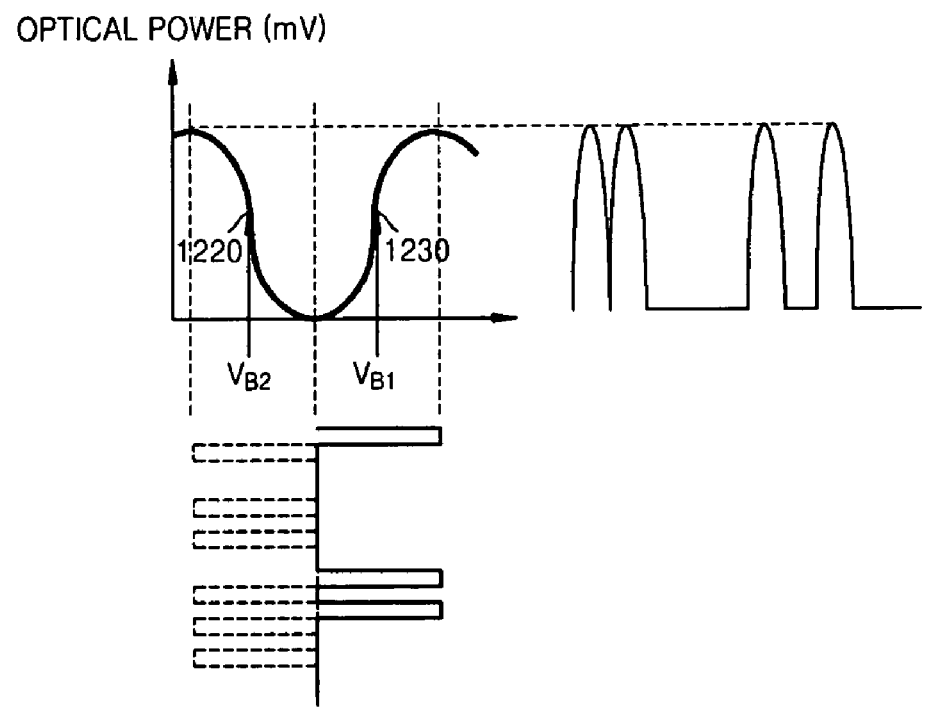

FIGS. 12A and 12B are graphs illustrating an adequate point to which a DC bias is applied in the CS-RZ optical generating apparatus according to a preferred embodiment of the present invention.

If the same voltages are biasing on each arm of the dual electrode optical modulator as shown in FIG. 12A, two RF signals are mixed as shown with reference numeral 1210. Thus, the bias unit 650 applies a predetermined DC bias voltage 1220.

For one of the two RZ signals that is in-phase and non-inverting, DC voltage is determined at a middle point of a falling curve, which corresponds to one of the quadrate points in a transfer function of a dual electrode optical modulator. The term of "quadrate" originates from the ¼ points if the one period of the transfer function is divided by 4, such as maximum, $1^{st}$ quadrate, minimum, $2^{nd}$ quadrate points.

A predetermined DC bias voltage 1230 corresponds to the other of the two RZ signals that is out-of phase (i.e., delayed by half a period of the RZ signal) at a middle point of a rising curve, which corresponds to the other of the quadrate points. As shown in FIG. 12B, when the biases are applied to the adequate points an optical CS-RZ signal is generated.

Figure 13:
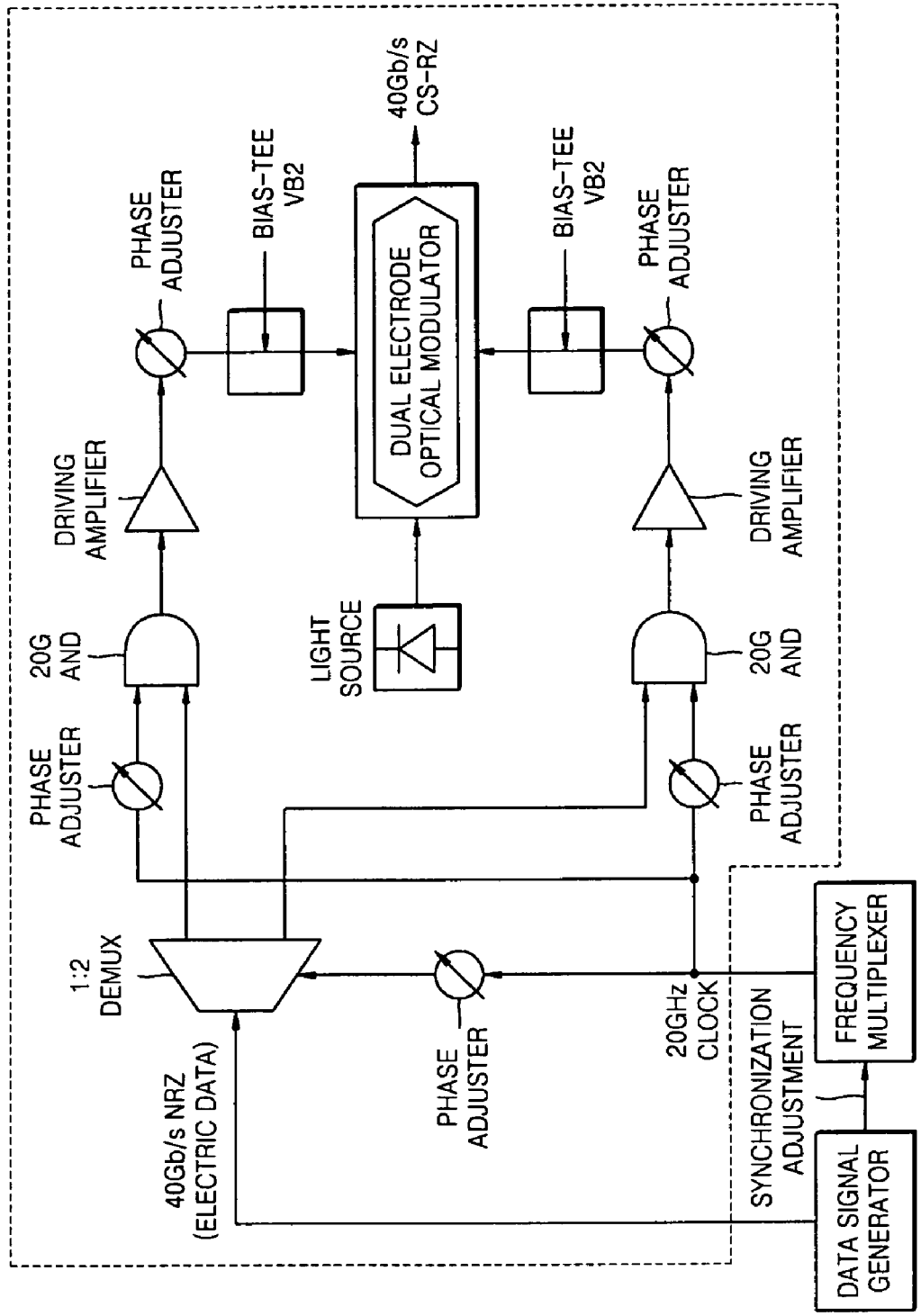
FIG. 13 is a block diagram of a CS-RZ optical generating apparatus excluding LPFs according to another preferred embodiment of the present invention.

FIG. 13 is a block diagram of a CS-RZ optical generating apparatus not including LPFs according to another preferred embodiment of the present invention.

LPFs shown in FIG. 6 pass through only a low frequency band of a signal. This results in a reduction of an optical spectrum. However, the CS-RZ optical generating apparatus shown in FIG. 13 does not require filters depending on a target transmission distance or the like. For example, in the short-reach and low-cost applications, LPFs may not be needed.

Figure 14:
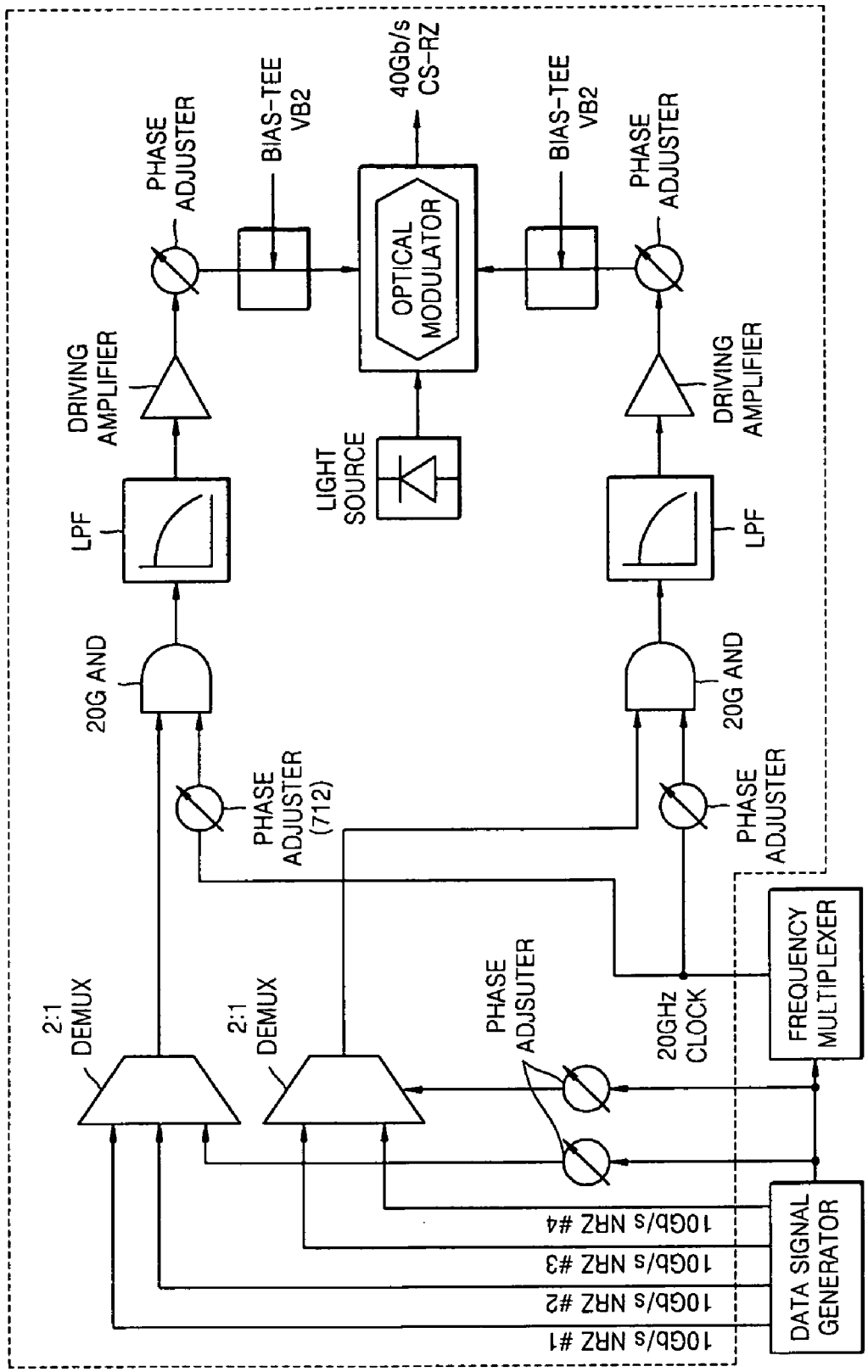
FIG. 14 is a block diagram of a CS-RZ optical generating apparatus with the same structure of the CS-RZ optical generating apparatus of FIG. 6 except that the classifier 600 is modified according to still another preferred embodiment of the present invention.

FIG. 14 is a block diagram of a CS-RZ optical generating apparatus having the same structure of the CS-RZ optical generating apparatus of FIG. 6 except that the classifier 600 is modified according to still another preferred embodiment of the present invention.

In the CS-RZ optical generating apparatus of FIG. 14, the classifier 600 could be replaced by two 2:1 multiplexers. The time-division multiplexing (TDM) scheme as shown in FIG. 14 only requires two 20 Gb/s data for two AND logic circuits at the next stage. It doesn't need any 40 Gb/s 1:2 de-multiplexer as shown in FIG. 7, although the configuration of FIG. 7 is valid in this case.

In this case, 10 GHz phase adjusters adjusting a phase of a 10 GHz input to the 2:1 multiplexers can replace 20 GH phase adjusters adjusting a phase of a 20 GHz clock input to 1:2 demultiplexer.

As described above, an optical signal generating apparatus according to the present invention can use only one optical modulator so as to reduce cost. Also, the optical signal generating apparatus can have a function of limiting a bandwidth electrically. Thus, an optical spectrum can be further inhibited. As a result, the optical signal generating apparatus can be robust to dispersion on the fiber-optic links.

In addition, two driver amplifiers operating in a linear region can be enough to amplify up to the peak-to-peak amplitude required because the dual driving on each arm makes the amplitude decrease by a half when compared with the conventional CS-RZ method. Thus, the occurrence of noise can be remarkably reduced. Also, the optical signal generating apparatus can more easily generate an optical signal in an ultrahigh speed optical communication system of more than 40 Gb/s because the bit-rate is a half of the bit-rate achieved by the CS-RZ method using a mixer.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for generating a CS-RZ (carrier suppressed-return to zero) optical signal comprising:
    a classifier distributing an input signal including a plurality of bits into first and second electrical non-return-to-zero (NRZ) data signals with an identical transmission speed, wherein the first electrical NRZ data signal includes a first plurality of bits of the input signal and the second electric NRZ data signal includes a second plurality of bits of the input signal different from the first plurality of bits;
    a first signal transformer converting the first NRZ data signal into a first electrical return-to-zero (RZ) data signal using a full-frequency clock;
    a second signal transformer converting the second NRZ data signal into a second electrical RZ data signal using a full-frequency clock;
    a phase adjuster tuning a delay time difference between the first and second electrical RZ data signals after the first and second signal transformers have converted the two NRZ signals into the first and second electrical RZ data signals, so that the second electrical RZ data signal has to be delayed against the first electrical RZ data signal by half a period of the first electrical RZ data signal;
    a bias unit applying different direct current (DC) bias voltages to the first and second RZ electric data signals, respectively; and
    a dual electrode optical modulator transforming the first electrical RZ data signal and the second electrical RZ data signal delayed against the first electrical RZ data signal into an optical CS-RZ signal;
    wherein the first and second signal transformers respectively further comprise amplifiers operating in a linear region amplifying the first and second RZ data signals to a driving voltage of a dual electrode optical modulator, and the phase adjuster tunes the delay time difference between the amplified first and second electrical RZ data signals.

2. The apparatus of claim 1, wherein the classifier comprises a 1:2 demultiplexer demultiplexing an input signal into two NRZ data signals with an identical transmission speed using time-division demultiplexing.

3. The apparatus of claim 1, wherein the classifier comprises a few multiplexers multiplexing a plurality of input signals with low bit-rates into two NRZ data signals with an identical transmission speed.

4. The apparatus of claim 1, wherein the first signal transformer comprise a low pass filter inhibiting a high frequency signal of the first RZ data signal to limit a bandwidth.

5. The apparatus of claim 1, wherein the second signal transformer comprises a low pass filter inhibiting a high frequency signal of the second RZ data signal to limit a bandwidth.

6. The apparatus of claim 1, wherein the first signal transformer comprises a phase adjuster allowing phases of a full-frequency clock and the NRZ data signal to coincide with each other before performing an AND digital logic operation on the clock and the NRZ data signal.

7. The apparatus of claim 1, wherein the second signal transformer comprises a phase adjuster allowing phases of a full-frequency clock and the NRZ data signals to coincide with each other before performing an AND digital logic operation on the clock and the NRZ input data signal.

8. The apparatus of claim 1, wherein the bias unit applies a predetermined DC bias voltage to one of the two RZ data signals that is in phase at a middle point of a falling curve of a transfer function of the dual electrode optical modulator and a predetermined DC bias voltage to the other of the two RZ data signals that is out of phase at a middle point of a rising curve of the transfer function of the dual electrode optical modulator.

9. A method of generating a CS-RZ optical signal, comprising:
    classifying an input signal into a first electrical NRZ input data signal and a second electrical NRZ input data signal with an identical transmission speed, wherein the first electrical NRZ data signal includes a first plurality of bits of the input signal and the second electric NRZ data signal includes a second plurality of bits of the input signal different from the first plurality of bits;

converting the two electrical NRZ data signals into first and second electrical RZ signals data using full-frequency clocks;

amplifying the first and second RZ data signals to a driving voltage of dual electrode optical modulator using an amplifier operating in a linear region;

adjusting a phase difference between the amplified first and second electrical RZ data signals after the two NRZ signals have been converted to the first and second RZ data signals and the converted first and second RZ data signals are amplified so that a time delay corresponding to half a period of the input signal exists between the first and second RZ signals;

applying different DC bias voltages to the first and second electrical RZ data signals; and transforming the first and second electrical RZ data signals into an optical CS-RZ signal using the dual electrode optical modulator.

10. The method of claim 9, wherein the classifying of the input signal into the two NRZ data signals with the identical transmission speed comprises demultiplexing an input signal into two NRZ input data signals with an identical transmission speed.

11. The method of claim 9, wherein the classifying of the input signal into the two NRZ data signals with the identical transmission speed comprises multiplexing a plurality of input signals with low bit-rates into two NRZ input signals with an identical transmission speed.

12. The method of claim 9, wherein the transforming of the first and second RZ data signals into the optical CS-RZ signal comprises inhibiting high frequency signals of the first and second RZ signals to limit electrical bandwidths.

13. The method of claim 9, wherein the transforming of the first and second RZ data signals into the optical CS-RZ signal comprises allowing phases of a full-frequency clock and the NRZ data signal to coincide with each other before performing an AND digital logic operation on the clock and the NRZ data signal.

14. The method of claim 9, wherein a predetermined DC bias voltage is applied to one of the two RZ data signals that is in-phase at an middle point of a falling curve of a transfer function of the dual electrode optical modulator, and a predetermined DC bias voltage is applied to the other of the first and second RZ data signals that is out of phase at an middle point of a rising curve of the transfer function of the dual electrode optical modulator.

* * * * *